US011979657B1

(12) United States Patent
Grundhoefer (10) Patent No.: US 11,979,657 B1
(45) Date of Patent: May 7, 2024

(54) POWER EFFICIENT OBJECT TRACKING

(71) Applicant: Apple Inc., Cupertino, CA (US)

(72) Inventor: Anselm Grundhoefer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/402,462

(22) Filed: Aug. 13, 2021

Related U.S. Application Data

(60) Provisional application No. 63/078,196, filed on Sep. 14, 2020.

(51) Int. Cl.
*H04N 23/65* (2023.01)
*H04N 23/61* (2023.01)
*H04N 23/667* (2023.01)
*H04N 23/695* (2023.01)

(52) U.S. Cl.
CPC .............. *H04N 23/65* (2023.01); *H04N 23/61* (2023.01); *H04N 23/667* (2023.01); *H04N 23/695* (2023.01)

(58) Field of Classification Search
CPC ........... H04N 5/23241; H04N 5/23218; H04N 5/23245; H04N 5/23299
See application file for complete search history.

(56) References Cited

U.S. PATENT DOCUMENTS

| 9,851,787 | B2 | 12/2017 | Latta et al. | |
|---|---|---|---|---|
| 10,302,482 | B2 | 5/2019 | Park et al. | |
| 2017/0220119 | A1* | 8/2017 | Potts | G06F 3/0346 |
| 2019/0287296 | A1 | 9/2019 | Sipko et al. | |
| 2020/0090656 | A1* | 3/2020 | Wantland | G06F 3/167 |
| 2022/0277463 | A1* | 9/2022 | Schlattmann | A63F 13/213 |

FOREIGN PATENT DOCUMENTS

| EP | 3863275 A1 * | 8/2021 | ........... G06T 7/0002 |
|---|---|---|---|
| WO | WO 2019/145954 | 8/2019 | |
| WO | WO-2021155946 A1 * | 8/2021 | |

* cited by examiner

*Primary Examiner* — Tat C Chio
(74) *Attorney, Agent, or Firm* — BAKERHOSTETLER (57) ABSTRACT

Implementations of the subject technology provide power efficient object detection for electronic devices. Power efficient object detection can be provided in order to allow extended tracking of objects by portable devices such as battery powered devices. In one or more implementations, a recommendation engine including a machine learning model and/or a rule-based recommendation process may be provided that has been trained to output a sensor recommendation indicating at least one sensor for object tracking. The sensor recommendation can indicate which of several sensors to operate to track a particular object and/or an accuracy level for operating the recommended sensor.

31 Claims, 6 Drawing Sheets

POWER EFFICIENT OBJECT TRACKING

CROSS REFERENCE TO RELATED APPLICATIONS

This application claims the benefit of priority to U.S. Provisional Patent Application No. 63/078,196, entitled "POWER EFFICIENT OBJECT TRACKING," filed on Sep. 14, 2020, the disclosure of which is hereby incorporated herein in its entirety.

TECHNICAL FIELD

The present description relates generally to object detection and tracking by electronic devices.

BACKGROUND

Extended reality technology aims to bridge a gap between virtual environments and a physical environment by providing an extended reality environment that is enhanced with electronic information. As a result, the electronic information appears to be part of the physical environment as perceived by a user. Detecting and tracking of objects in the physical environment, for display of electronic information in connection with those objects, can be challenging.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide power efficient tracking of physical objects in the physical environment, such as by an XR system. For example, the subject technology may provide power efficient operations for object detection and/or tracking in extended reality applications. For example, system processes may be performed to determine the most power efficient sensors or groups of sensors, and/or power efficient modes of operation for a sensor, for object detection and/or tracking.

In one or more implementations, the amount of power consumed by a sensor or a set of sensors in one or more operational modes may be used to determine which sensors to use for object tracking. In contrast with using power consumption alone as a metric for selecting sensors, improved performance can be provided by using environmental context information and/or machine learning predictions of device usage and/or power consumption to select the most power efficient sensors and/or combinations of sensor for object detection and/or tracking, at a given time and/or for a particular application. For example, sensor data from one or more sensors of a device may be provided as inputs to a recommendation engine that is configured to detect an object and to recommend one or more sensors and/or one or more operational modes for the sensors, for continued tracking of the detected object.

Figure 1A:
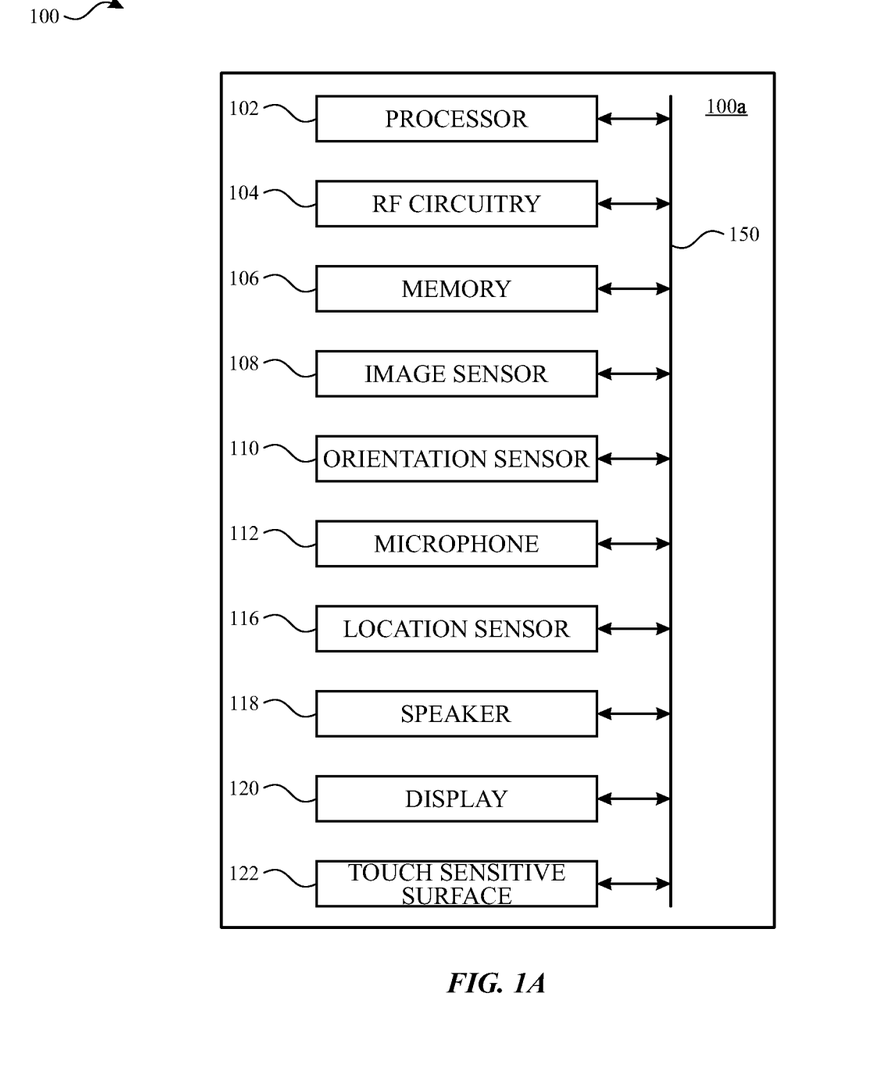
FIGS. 1A-1B depict exemplary systems for use in various extended reality technologies, in accordance with one or more implementations.
Figure 1B:
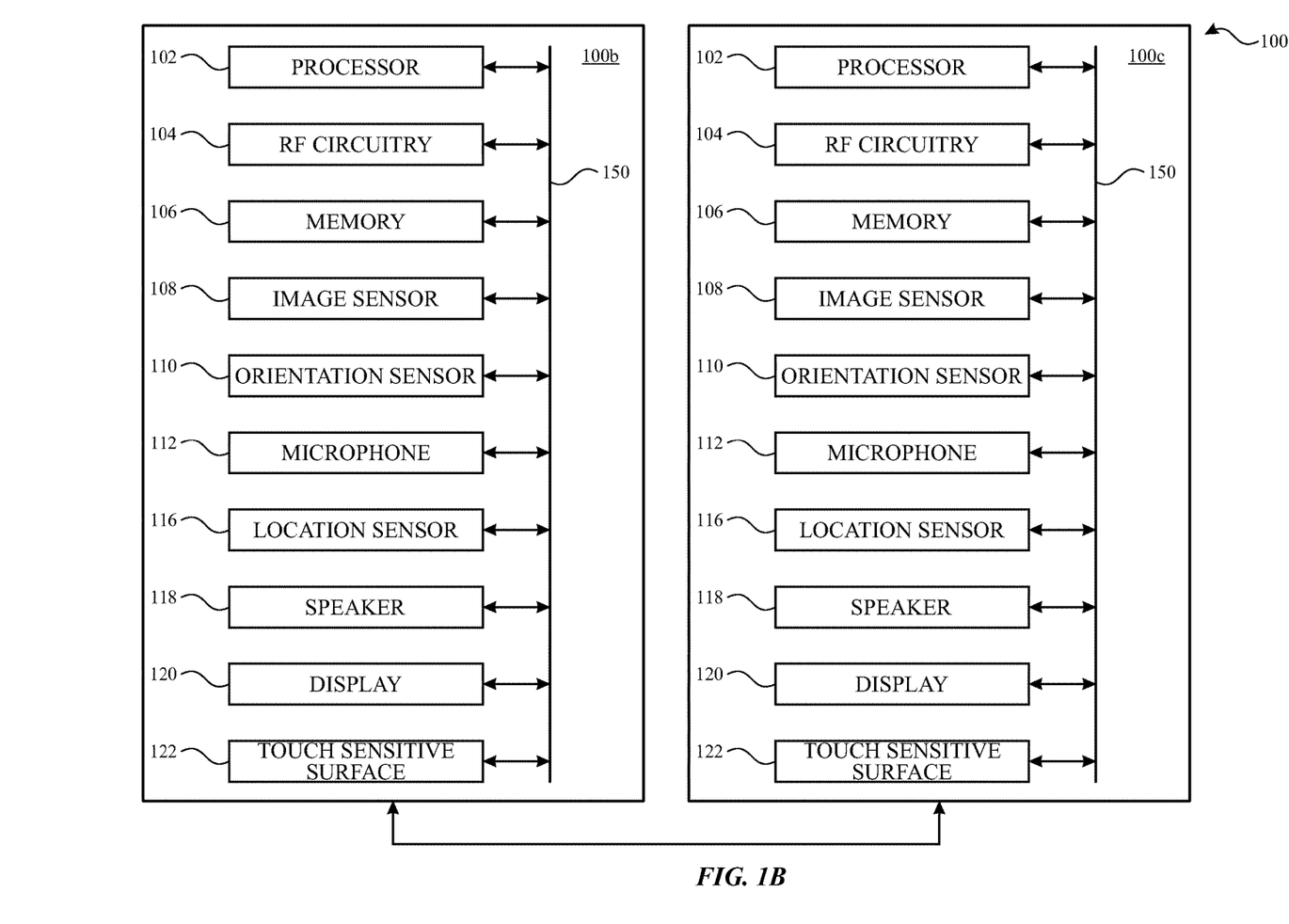

FIG. 1A and FIG. 1B depict exemplary system 100 for use in various extended reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a mobile device such as a smartphone or a tablet, or a wearable device such as a watch or a head-mountable device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a mobile device such as a smartphone or a tablet, or a wearable device such as a watch or a head-mountable device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical environment (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical environment. Image sensor(s) also optionally include one or more infrared (IR) sensor(s), such as a passive IR sensor or an active IR sensor, for detecting infrared light from the physical environment. For example, an active IR sensor includes an IR emitter, such as an IR dot emitter, for emitting infrared light into the physical environment. Image sensor(s) 108 also optionally include one or more event camera(s) configured to capture movement of physical elements in the physical environment. Image sensor(s) 108 also optionally include one or more depth sensor(s) configured to detect the distance of physical elements from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical elements in the physical environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed elements in the physical environment.

In some examples, system 100 includes microphones(s) 112. System 100 uses microphone(s) 112 to detect sound from the user and/or the physical environment of the user. In some examples, microphone(s) 112 includes an array of microphones (including a plurality of microphones) that optionally operate in tandem, such as to identify ambient noise or to locate the source of sound in space of the physical environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical environment. Orientation sensor(s) 110 optionally include one or more gyroscopes and/or one or more accelerometers.

Figure 2:
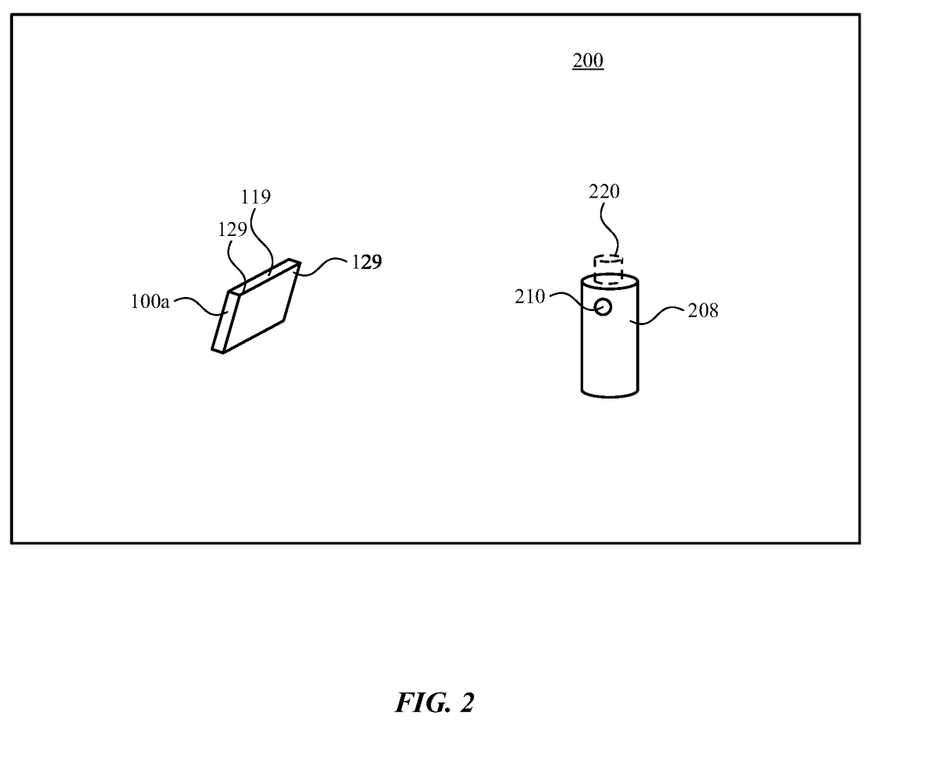
FIG. 2 illustrates an example of a physical environment of an electronic device in accordance with implementations of the subject technology.

FIG. 2 illustrates an example physical environment in which an electronic device such as electronic device 100*a* may be implemented and/or operated, according to aspects of the disclosure. In the example of FIG. 2, a physical environment 200 of electronic device 100*a* includes a physical object 208. Camera(s) 119 (e.g., including an implementation of image sensor(s) 108 of FIGS. 1A and 1B) and/or sensors 129 (e.g., including an implementation of orientation sensor 110 and/or location sensor 116 of FIGS. 1A and 1B and/or other sensors such as depth sensors) of electronic device 100*a* can be used as described herein for power efficient detection and/or tracking of the physical object 208 and/or one or more features and/or portions of the physical object (e.g., such as portion 210 of the physical object). In one or more implementations, sensors 129 of electronic device 100*a* may include (e.g., in addition to and/or incorporated as part of image sensor 108, orientation sensor 110, and/or location sensor 116) one or more cameras, image sensors, touch sensors, microphones, inertial measurement units (IMU), heart rate sensors, temperature sensors, depth sensors such as Lidar sensors, radar sensors, sonar sensors, and/or time-of-flight sensors, GPS sensors, Wi-Fi sensors, near-field communications sensors, etc. In various implementations, depth information can be obtained using one or more depth sensors and/or using multiple cameras (e.g., and information indicating relative positions and/or distances between the multiple cameras) or using camera images combined with motion information such as IMU information.

In one or more implementations, physical objects may be detected and/or classified by electronic device 100*a* and the location, position, size, dimensions, shape, and/or other characteristics of the physical objects can be determined and/or tracked using camera(s) 119 and/or sensors 129. The tracked physical objects can be used, for example, for anchoring virtual content for display within the XR environment.

In the example of FIG. 2, electronic device 100*a* displays a virtual object 220 at or near the location of physical object 208. For example, virtual object 220 may be displayed at the location shown in FIG. 2 by anchoring the virtual object to the physical object 208 or to a feature of the object such as portion 210 of the physical object.

In order to track the physical object 208 and/or the portion 210 of the physical object, sensor data from camera(s) 119 and/or sensors 129 may obtained and provided to a recommendation engine. A recommendation engine of electronic device 100*a* may identify the physical object 208, one or more features of the physical object such as portion 210 of the physical object, classify the physical object or the portion thereof (e.g., determine a type of the object or the portion thereof), and may provide a sensor recommendation, based on the detected object, for power efficient continued tracking of the physical object 208 and/or the portion thereof.

In one illustrative example operational scenario, physical object 208 may be a vehicle such as a car, and virtual object 220 may be virtual elephant displayed to appear to be riding on the car. In this example scenario in which the object to be tracked is large and the virtual object is anchored generally to the location of the large physical object, relatively low resolution sensor data can be used to track the car. For example, data generated by a modified operation state of the camera(s) 119 and sensor(s) 129 as recommended by the recommendation engine, such as data from a subset of the pixels of camera 119, data from a subset of multiple cameras of the device, camera data obtained at a reduced frame rate, data from a depth sensor having a resolution (e.g., one pixel, two pixels, four pixels, sixteen pixels, etc.) that is lower than the resolution (e.g., thousands of pixels or millions of pixels) of camera 119, depth sensor data obtained at a reduced sampling rate, or depth information obtained using image data and/or IMU data (e.g., without operating a depth sensor), can be used to track a large physical object such as a car. In another illustrative example operational scenario, electronic device 100*a* may be used to display a virtual object 220 implemented as virtual bird resting on a portion 210 of the physical object, such as on a side mirror of the car. Tracking the location and/or shape of the side mirror for display of a virtual bird thereon may use a higher resolution sensor or set of sensors (and/or a higher frame rate or sampling rate) than tracking the entire car. Accordingly, in this other illustrative example scenario, a modified operation state corresponding to the sensor recommendation, such as a full resolution or a higher resolution of the camera 119, can be used to track the mirror of the car.

Although a single physical object, a single portion of the physical object, and a single virtual object are depicted in FIG. 2, this is merely illustrative, and the subject matter disclosed herein can be applied to any number of physical objects, any number of portions of the physical objects, and/or any number of a virtual objects and/or other virtual content.

Figure 3:
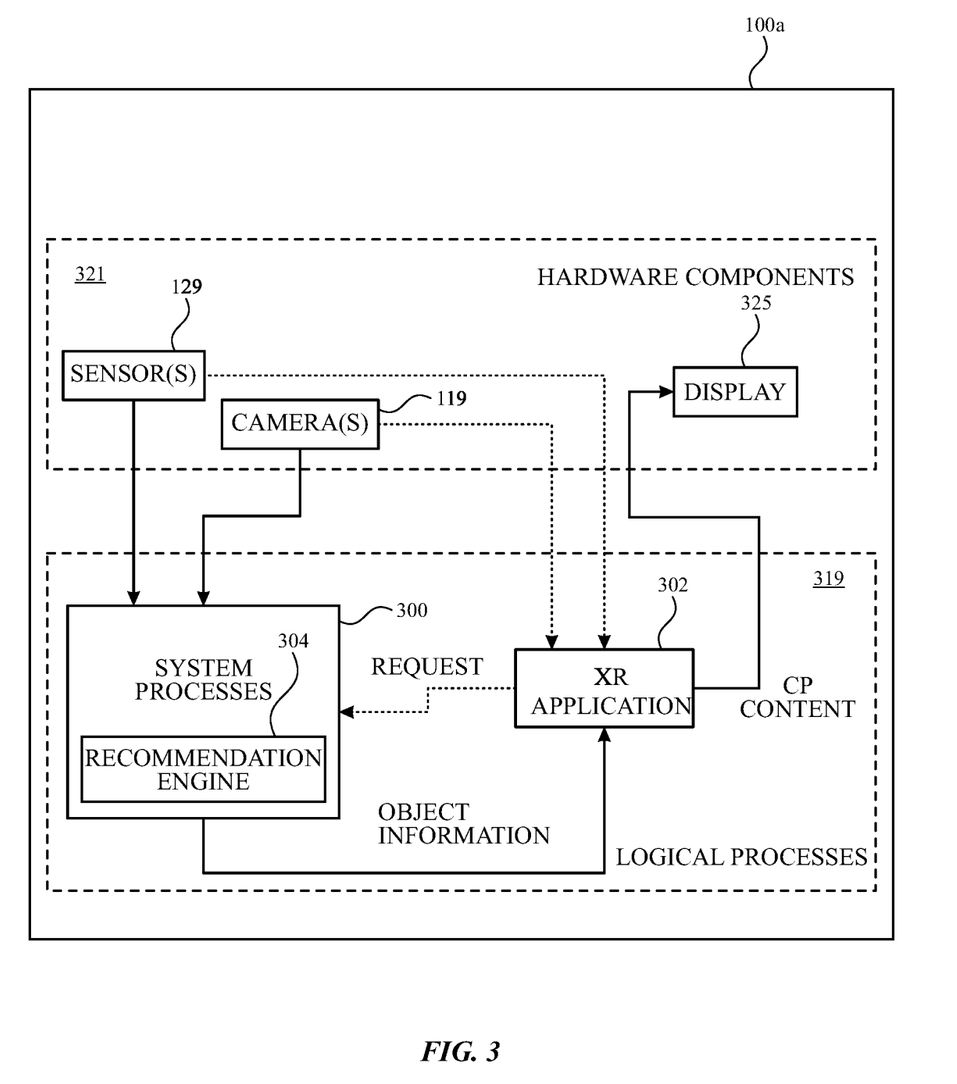
FIG. 3 illustrates an example architecture that may implement the subject technology in accordance with one or more implementations of the subject technology.

FIG. 3 illustrates an example architecture, including hardware components 321 and logical processes 319, that may be implemented on the electronic device 100*a* in accordance with one or more implementations of the subject technology. For explanatory purposes, portions of the logical processes 319 of the architecture of FIG. 3 are described as being implemented by the electronic device 100*a* of FIGS. 1A and 1B, such as by a processor and/or memory of the electronic device; however, appropriate portions of the architecture may be implemented by any other electronic device, including the electronic device 100*b*, and/or electronic device 100c. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of logical processes 319 of the architecture of FIG. 3 can be implemented in software or hardware, including by one or more processors and a memory device containing instructions, which when executed by the processor cause the processor to perform the operations described herein. In the example of FIG. 3, camera(s) 119 and sensors 129 provide sensor data (e.g., images or other image data such as color image data and/or monochrome image data, depth sensor data from one or more depth sensors, location data such as global positioning system (GPS) data, Wi-Fi location data, and/or near field communications location data, and/or device motion data from one or more motion sensors such as an accelerometer, a gyroscope, a compass, an inertial measurement unit (IMU) including one or more accelerometers and/or gyroscopes and/or compasses, and/or other motion sensors), for example, to a system process such as system process 300.

As shown in FIG. 3, system process 300 may implement a recommendation engine 304. In various implementations, system process 300 (e.g., using recommendation engine 304) may use the sensor data from camera(s) 119 and/or sensors 129 to (i) detect, identify, and/or classify a physical object such as physical object 208 and/or a portion thereof, and (ii) provide a sensor recommendation for power efficient tracking of the physical object and/or the portion thereof. In one or more implementations, recommendation engine 304 may implement, for example, one or more machine learning models that are trained to (i) detect, identify, and/or classify a physical object such as physical object 208 and/or a portion thereof, and (ii) provide a sensor recommendation for power efficient tracking of the physical object and/or the portion thereof, responsive to receiving the sensor data as input(s). In one or more implementations, recommendation engine 304 may implement one or more rule based processes that (i) detect, identify, and/or classify a physical object such as physical object 208 and/or a portion thereof, and (ii) provide a sensor recommendation for power efficient tracking of the physical object and/or the portion thereof, responsive to receiving the sensor data as input(s). In one or more implementations, recommendation engine 304 may implement a combination of machine learning models and rule-based processes. For example, recommendation engine 304 may include a computer vision model trained to detect, identify, and/or classify a physical object such as physical object 208 and/or a portion thereof and one or more rule-based processes that provide a sensor recommendation for power efficient tracking of the physical object and/or the portion thereof, responsive to receiving the sensor data as input(s).

Based on the detection and the sensor recommendation, the system process 300 may modify an operation state of one or more of camera(s) 119 and/or sensors 129 (e.g., by activating or deactivating one or more sensors and/or groups of sensors, and/or by activating or deactivating portions of a sensor such as a subset of the pixels of an image sensor). For example, the power efficient sensor recommendation can be used to selectively activate a specific combination of sensors (e.g., a recommended subset of the sensors 129) that achieves sufficient object tracking performance in the most power efficient manner, as will be discussed in detail further herein. The system process 300 may then obtain additional sensor data from the activated camera(s) 119 and/or sensors 129 (e.g., in the modified operation state), and can provide object information such as detected object information and/or object tracking information to an application running on the device, such as XR application 302. As shown, XR application 302 may generate computer-produced (CP) content, using the object tracking information, and provide the CP content for display by a display 325 (e.g., an implementation of display 120 of FIGS. 1A and 1B) of the electronic device 100a. As shown in FIG. 3, in various implementations, the object tracking information may include the sensor data obtained by the system process 300 based on the sensor recommendation from recommendation engine 304, and/or may include processed object tracking information that is based on the sensor data.

As shown in FIG. 3, in one or more implementations, an application such as XR application 302 may provide a request to the system processes 300 for the object tracking information. The request may include a request for tracking of a particular object or a particular type of object, and/or a request for sensor data of a particular accuracy (e.g., sensor data having a particular spatial and/or temporal resolution). The system process 300 (e.g., including recommendation engine 304) may determine a power efficient sensor recommendation based on the request and/or based on additional information. The additional information may include, as examples, power information for the device (e.g., power source information and/or a charge level of a battery of the device), user device usage history information (e.g., information indicating typical usage of sensor data and/or XR application 302 by a user of the device), and/or information (e.g., sensor data and/or other contextual and/or environmental information from another device).

In one or more implementations, one or more of the XR application 302, system processes 300, and/or CP rendering operations for rendering CP content from XR application 302, may be a part of an operating system level process and/or framework that provides for object tracking and/or virtual content anchoring functionality.

Figure 4:
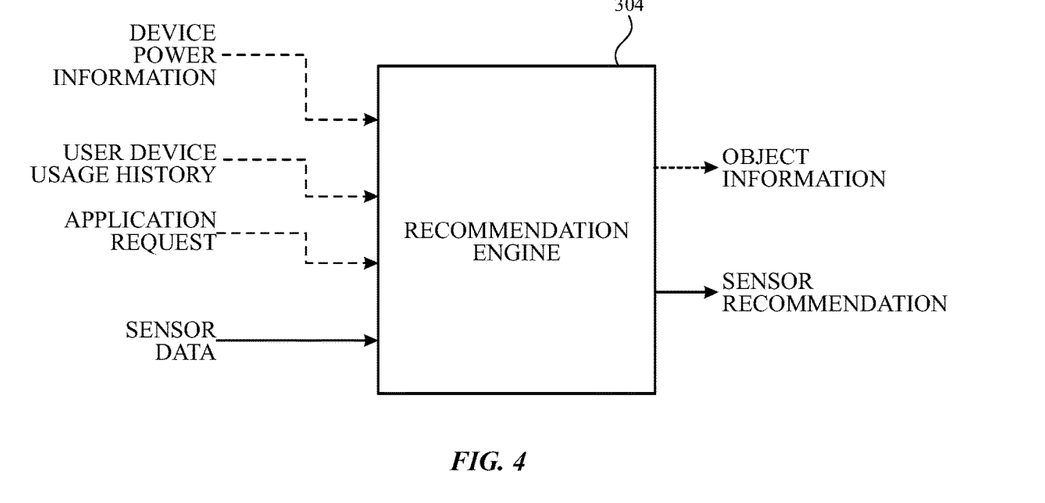
FIG. 4 illustrates a schematic diagram for operation of a recommendation engine for power efficient object tracking in accordance with implementations of the subject technology.

FIG. 4 illustrates a schematic diagram showing how sensor data, such as sensor data from camera(s) 119 and/or sensors 129, may be provided, as input, to a recommendation engine 304. As shown, the recommendation engine 304 may have been trained to output a sensor recommendation responsive to receiving the sensor data as input. In one or more implementations, the recommendation engine 304 may also, optionally, output object information (e.g., as an additional output to the sensor recommendation). The object information may include a position, an orientation, a type, a location, a motion, a shape, a classification, and/or any other information for one or more detected objects in the physical environment of the electronic device 100a. Although the example of FIG. 4 illustrates recommendation engine 304 outputting both object information and a sensor recommendation, it should be appreciated that the object information may be generated and/or output by another engine or process (e.g., an object detection engine). In one or more implementations in which a separate object detection engine is provided, the object information from the object detection engine may be provided to the recommendation engine 304 (e.g., along with the device power information, the user device usage history information, the application request, and/or additional sensor data). The sensor recommendation may indicate which of camera(s) 119 and/or sensors 129 to use to continue tracking the detected objects. The sensor recommendation may be a recommendation to increase or decrease the accuracy of the sensor data for tracking the object, relative to the accuracy of the sensor data that was input to the recommendation engine for detecting the object. The sensor recommendation may be recommendation to deactivate some sensors (e.g., the depth sensor, the IMU, etc.) and/or to deactivate some portions of one or more sensors (e.g., a subset of the pixels of an image sensor) that are not needed to achieve sufficient object tracking performance for a particular object.

For example, the recommendation engine 304 may have been trained to recommend usage of a sensor having a power consumption and an accuracy (e.g., a spatial and/or temporal resolution) that is lower than the power consumption and accuracy of the sensor(s) used to detect an object (e.g., by using another sensor with a lower power consumption and accuracy, or by using the same sensor(s) at a lower power/accuracy level such as by operating reduced number of pixels or sensing elements of the sensor(s) and/or by reducing the hardware and/or software processing complexity for sensor data from the sensor(s)), for continued tracking of the object (e.g., using a lower spatial resolution in scenarios in which the detected object is large and/or stationary and/or using a lower temporal resolution or frame rate in scenarios in which the detected object is slow moving). As another example, the recommendation engine 304 may have been trained to recommend usage of a sensor having relatively higher power consumption and a relatively higher accuracy (e.g., higher spatial and/or temporal resolution), for continued tracking of a small object, a fast moving object, or a particular portion of an object. For example, a higher spatial resolution sensor or mode of operation of a sensor may be used for tracking of a small object or a portion of an object (e.g., for an XR application that displays virtual content overlaid on a particular area of a particular type of detected object, such as a virtual hat on a person's head, virtual sunglasses over a person's eyes, a virtual bird on a physical car mirror, virtual bubbles emanating from the spout of a physical bottle of soda, or another virtual object 220 on a portion 210 of a physical object 208). As another example, a higher temporal resolution (e.g., a higher frame rate or sampling rate) may be used for tracking of a fast moving object (e.g., in which significant change in the position of the object is detected between image frames). In some operational scenarios, the recommendation engine 304 may recommend a relatively lower spatial resolution and a relatively higher temporal resolution than the spatial resolution and temporal resolution used to detect an object (e.g., when the object to be tracked is a large object, such as a car, that is fast moving). In one or more implementations, the recommendation engine 304 may recommend that the temporal resolution/accuracy for tracking the same object be increased or decreased when the sensor data indicates an increase or decrease in the motion or speed of motion of the object.

As shown in FIG. 4, additional information may be provided, as input, to recommendation engine 304. The additional information may include device power information (e.g., a charge level of a battery of the device), battery drain rate, thermal information (e.g., including a temperature of the device, a component of the device, and/or the external environment, as measured using the sensors of the device and/or external sensors), environmental information, user device usage history information, and/or an application request. For example, the recommendation engine 304 may determine that the current and/or expected external temperature is affecting and/or will affect the battery drain rate and adjust the sensor recommendation accordingly (e.g., by recommending relatively lower power sensors and/or sensor combinations in a relatively cold environment or when the temperature is expected to fall while operating the sensors and/or by recommending relatively higher power sensors and/or sensor combinations in a relatively warm environment or when the temperature is expected to rise while operating the sensors). As another example, the environmental information may indicate that the device is in a low light environment and limit a reduction in exposure time that would otherwise (e.g., in high ambient light conditions) allow a reduced power operation of a camera but could prevent the camera from functioning to detect and/or track an object due to camera noise relative to the low light input to the camera. The recommendation engine 304 may have been trained and/or may include rules to recommend relatively higher power and/or higher accuracy sensors and/or modes of operation of the sensors when the device power information indicates a relatively high level of charge and/or to recommend relatively lower power and/or lower accuracy sensors and/or modes of operation of the sensors when the device power information indicates a relatively low level of charge.

The user device usage history information may indicate, for example, a typical (e.g., a most recent, a median, or an average) length of time that a particular user uses a particular application and/or uses an object tracking functionality of an application. This user device usage history information may also include information related to spatial locations and/or one or more time periods (e.g., a time of day, a day of the week, a week of the month, a month of the year, etc.). For example, the user device usage history information may indicate that the same application is used differently when the device is at or near the user's home and when the device is located in or near the user's office. As another example, the user device usage history information may indicate that the same application is used differently in the morning and in the afternoon, on a weekday and on a weekend, during the first week of the month and the fourth week of the month, or during February and during August (as examples). The recommendation engine 304 may have been trained and/or include rules to recommend relatively higher power and/or higher accuracy sensors and/or modes of operation of the sensors when the user device usage history information indicates a relatively short typical amount of usage time (e.g., one minute, two minutes, less than five minutes, less than ten minutes, less than an hour) for a particular user, particular application, and/or particular mode of operation, and/or to recommend relatively lower power and/or lower accuracy sensors and/or modes of operation of the sensors when the user device usage history information indicates a relatively long typical usage time (e.g., thirty minutes) for a particular user, particular application, and/or particular mode of operation.

As described above in connection with FIG. 3, in one or more implementations, an application request from an application, such as XR application 302, may be provided as input to the recommendation engine 304. In one or more implementations, the application request may be a request for detection and/or tracking of a particular physical object, a particular type of physical object, and/or a particular size of physical object. For example, the application request may include a request for detection and tracking of a table (e.g., on which a virtual cup can be displayed), a ball, a round object, a horizontal surface, a vertical surface, a mobile phone, a particular product or product type, etc.

In one or more implementations, the application request may include a request for sensor data of a particular (e.g., minimum) accuracy and/or object tracking with a particular (e.g., minimum) accuracy. The request for sensor data of a particular accuracy may include a request for image data of a particular spatial and/or temporal resolution, a request for depth information such as depth sensor data (e.g., of a particular spatial and/or temporal resolution), and/or a request for sensor data from a particular one or set of sensors 129. The request for sensor data of a particular accuracy and/or object tracking with a particular accuracy may be, for example, a selection of an accuracy level from a set of accuracy levels provided by system process 300 (e.g., a set of accuracy levels including a high accuracy level, a medium accuracy level, a low accuracy level, and/or other accuracy levels such as a six degree-of-freedom (6DOF) accuracy level or a three degree-of-freedom 3DOF accuracy level) for object tracking. Each accuracy level may correspond to a set of one or more of sensors 129 and/or camera(s) 119, and/or a mode of operation of the sensors and/or cameras for object tracking at that accuracy level. Each accuracy level may have an associated spatial resolution and/or an associated temporal resolution. An application request for sensor data of a particular accuracy and/or object tracking with a particular accuracy may be provided to recommendation engine 304, or to system process 300 independent of recommendation engine 304. In one or more implementations, recommendation engine 304 may provide a sensor recommendation that indicates usage of one or more sensors and/or one or more modes of operation that correspond to an accuracy level that is different from, or the same as, the accuracy level requested by an application (e.g., based on other inputs to the ML model as described herein). For example, the recommendation engine 304 may recommend a different accuracy level from the requested accuracy level based on other input information such as device power information, user device usage history information, and/or the sensor data.

Using recommendation engine 304 to generate sensor recommendations allows an electronic device such as electronic device 100a to simultaneously incorporate potentially competing input data such as device power information, user device usage history information, application request information, sensor data, and/or detected object information (e.g., object size information, object distance information, object type information, etc.), to balance performance and power consumption in various operational scenarios (e.g., and thereby provide power efficient object tracking).

In one or more implementations, based on additional received sensor data, the sensor recommendations of the recommendation engine can be confirmed (e.g., by system process 300 and/or XR application 302), or a different sensing strategy may be requested, determined, and/or executed. For example, while tracking a physical object based on a sensor recommendation from recommendation engine 304, the system process 300 may determine that the tracking is becoming and/or has become unreliable and may modify the sensor usage to increase the accuracy (and allow additional power consumption) and/or can request an updated sensor recommendation from recommendation engine 304 based on new sensor data. In one or more implementations, portions of the environment context information (e.g., sensor data, user history information, and/or other environmental context information) that is provided as input to recommendation engine 304 may be obtained from another device, such as a mobile phone of the user of electronic device 100a, and/or from another device of another user, such as another user in a shared XR experience.

In one or more implementations, the sensor recommendation from recommendation engine 304 may be a time-dependent sensor recommendation that indicates turning on and/or off one or more sensors and/or portions of sensors at various specified times for continued power efficient tracking of an object. For example, hierarchical flows may be established to turn sensors on and/or to a higher accuracy just before tracking falls below a threshold or is lost and/or at one or more predetermined future times, to further optimize power consumption and reliability.

Figure 5:
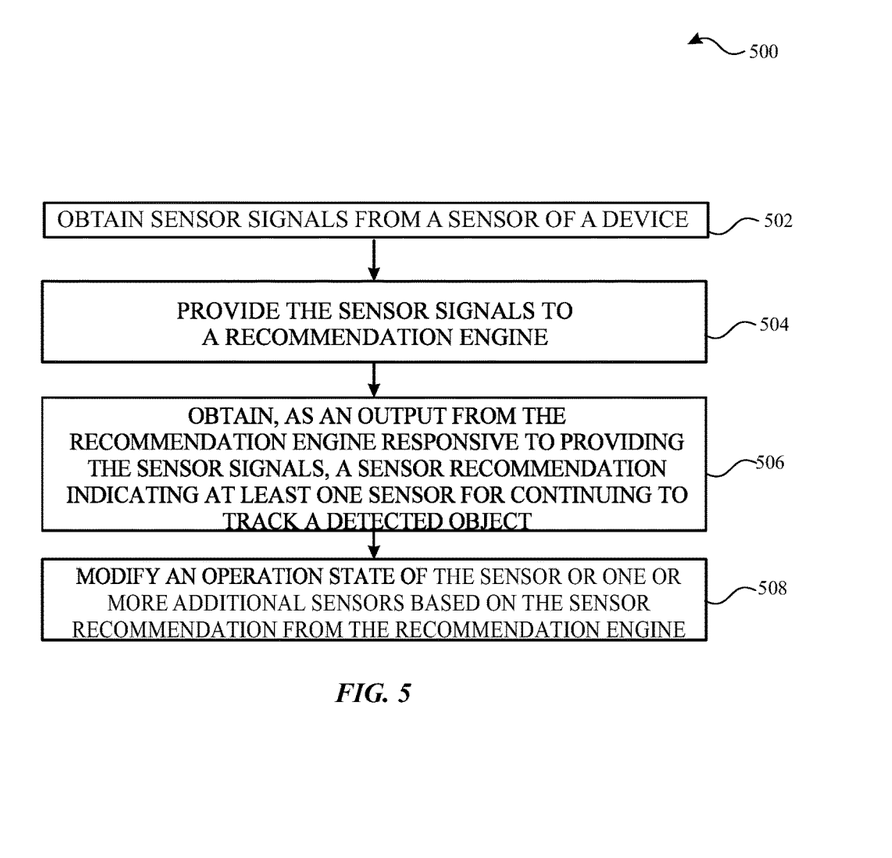
FIG. 5 illustrates a flow chart of example operations that may be performed for providing power efficient object tracking in accordance with implementations of the subject technology.

FIG. 5 illustrates a flow diagram of an example process 500 for providing power efficient object tracking in accordance with implementations of the subject technology. For explanatory purposes, the process 500 is primarily described herein with reference to the electronic device 100a of FIGS. 1A, 1B, and 3. However, the process 500 is not limited to the electronic device 100a of FIGS. 1A, 1B, and 3, and one or more blocks (or operations) of the process 500 may be performed by one or more other components of other suitable devices, including the electronic device 100b and/or the electronic device 100c. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, an electronic device such as electronic device 100a obtains sensor signals from a sensor of a device. The sensor may include, for example, any of sensors 129 and or camera(s) 119 described herein. The sensor may be, for example, a high resolution sensor such as a color image sensor of camera(s) 119. The electronic device may also obtain additional sensor signals from other sensors of the device (e.g., depth signals from a depth sensor, IMU data and/or other motion information for the electronic device, images such as monochrome images from other image sensors of the device, sonar signals from a sonar sensor of the device, etc.) and/or sensors of another device (e.g., another device that is registered to the same account as an account of the electronic device 100a and/or another device of another user).

At block 504, the sensor signals can be provided to a system process such as recommendation engine 304 (e.g., including one or more machine learning models and/or other algorithms and/or processes for object detection and/or sensor recommendation) of FIGS. 3 and 4. Sensor signals may be provided to the recommendation engine as raw sensor signals, or may be processed and/or formatted prior to being provided to the recommendation engine.

At block 506, the electronic device may obtain, as an output from the recommendation engine responsive to providing the sensor signals, a sensor recommendation indicating at least one sensor for continuing to track an object detected based on the sensor signals (e.g., continuing the track the object after detection). For example, the recommendation engine may include a machine learning engine and/or other process having been trained and/or otherwise configured to generate a sensor recommendation based on a type of the object, a size of the object, a location of the object, a motion of the object, a planned accuracy for the tracking of the detected object (e.g., as provided by an application such as XR application 302), power information for the electronic device, user device usage history information, and/or other information.

In one or more implementations, the object may also be detected by the recommendation engine, and/or by another process at the device such as an object detection engine configured to receive the sensor signals. In one or more implementations, the electronic device may obtain the detected object as a first output from the recommendation engine, responsive to providing the sensor signals, and obtain the sensor recommendation as a second output from the recommendation engine. The detected object may be a physical object in a physical environment of the electronic device. The first output from the recommendation engine, or an output of another object detection process, may include a location of the detected object, a type of the detected object, a size and/or orientation of the detected object, an image of the detected object, a depth map of the detected object, and/or other object information for the detected object. The recommendation engine or another process may detect the object based on the sensor data alone (e.g., without input information indicating a type of object that is expected to be detected) or based on a request (e.g. from an XR application) to detect a particular object or a particular object type.

The at least one sensor indicated in the sensor recommendation may be the same sensor used to obtain the sensor signals at block 502 (e.g., in a modified operation state such as in different mode of operation with a different spatial resolution or a different sampling rate or frame rate), or a different sensor (e.g., a sensor having higher or lower resolution than the sensor used to obtain the sensor signals at block 502). The different mode of operation and/or the different sensor may correspond to a modified operation state for the sensors and/or cameras of the device, and may be recommended based on a learned accuracy recommendation for the sensor data for tracking that object or a type of object corresponding to that object and/or a learned power consumption for obtaining the sensor data. For example, the recommendation engine may have been trained to recommend use of a relatively high resolution sensor (e.g., a color image sensor) for tracking an object or a portion of an object that is sufficiently small to fit into a person's hand (e.g., a portable electronic device, a branded product such as a can or a bottle of soda, or a portion of an object such as a headlamp on a car or a branch of a tree), and to recommend use of a relatively lower resolution sensor (e.g., a depth sensor) to track a relatively larger object such as a car or a vehicle or a tree. In one or more implementations, the sensor may be a color camera (e.g., a camera that includes a multi-channel imaging sensor that concurrently senses light of multiple wavelengths/colors), and the one of the one or more additional sensors may include a depth sensor.

In one or more implementations, the object may be detected (e.g., by the recommendation engine or another process such as a separate object detection engine) by performing a computer vision detection of the object, and the output from the recommendation engine may be a recommendation to operate the depth sensor for continuing to track the detected object. In one or more implementations, the object may be detected by performing a computer vision detection of the object, and the output from the recommendation engine may be a recommendation to obtain depth information based on image data from one or more cameras of the electronic device (e.g., stereoscopic image data from multiple cameras and/or as an output from a neural network that receives, as input, one or more camera images and position and/or motion information such as IMU information). For example, the output from the recommendation engine may include a recommendation to obtain depth information based on image data for continuing to track the detected object. In another example, the output from the recommendation engine may include a recommendation for image-based tracking of the detected object without obtaining depth information for the detected object (e.g., using a two-dimensional tracking of the detected object).

In one or more implementations, the recommendation engine may have been trained and/or otherwise configured to generate the output corresponding to the sensor recommendation using user device usage history information stored at the device (e.g., in addition to the sensor data and/or other additional information). For example, the user device usage history information may include a length of time that a user of the device previously operated the device (e.g., in general, at or near the current location of the device, and/or during a time period that is similar to a current time period such as during a time of day, day of the week, week of the month, or month of the year that is similar to the current time of day, day of the week, week of the month, or month of the year) to track an object having a type that is similar to a type of the object, a length of time that the user typically (e.g., on average and/or at the current device location and/or time period) operates an application that tracks the detected object, a length of time the user typically (e.g., on average and/or at the current device location and/or time period) operates the electronic device, a manner in which the user typically interacts with detected objects using the electronic device (e.g., in general or at the current location of the device and/or current time period), and/or other user device usage history information. In one or more implementations, the recommendation engine may have been trained and/or otherwise configured (e.g., using a rules-based configuration) to generate the output corresponding to the sensor recommendation using user device usage history information stored at the device and using current power information (e.g., a current charge level of a battery) for the electronic device. In one or more implementations, the user device usage history information may include user-configured information. For example, the user device usage history information may include a pre-adjusted level of tracking accuracy that has been configured by the user for the device to track an object having a type that is similar to a type of a detected object. As another example, the user device usage history information may include a pre-adjusted level of tracking accuracy that has been configured by the user for the device to track an object while the device is at or near a current location of the device. As another example, the user device usage history information may include a pre-adjusted level of tracking accuracy that has been configured by the user for the device to track an object during a time period that is similar to a current time period.

For example, the recommendation engine may recommend use of a relatively high power consumption, high accuracy sensor for tracking of an object if the user typically (e.g., in general or at or near the current location of the device and/or time period) uses an application that uses the object tracking information for a few minutes at a time (e.g., and/or if a battery of the device has a charge level above a charge threshold), and/or may recommend use of a relatively low power consumption, low accuracy sensor for tracking of the object if the user typically (e.g., in general or at or near the current location of the device and/or time period) uses the application that uses the object tracking information for a several hours (e.g., and/or if a battery of the device has a charge level below a charge threshold). In one or more implementations, the recommendation engine may recommend usage of high power, high accuracy sensor or set of sensors, even if the power level of the device is relatively low, if the recommendation engine has learned or been otherwise configured to determine that the current user typically (e.g., in general or at or near the current location of the device and/or time period) only uses the application using the sensors for a short time (e.g., that the user typically uses the application for less than one minute, in general or when the user is at work during a work day).

At block 508, the electronic device may modify an operation state of the sensor or one or more additional sensors based on the sensor recommendation from the recommendation engine. Modifying an operation state may include, as examples, changing the way a sensor operates (e.g., high/low resolution) and/or turning on/off the sensor or one or more additional sensors. For example, obtaining the sensor signals from the sensor of the device at block 502 may include obtaining the sensor signals while operating the sensor in a first operation state that includes a first frame rate for the sensor, and modifying the operation state of the sensor or the one or more additional sensors may include operating the sensor in a second operation state that includes a second frame rate that is less than the first frame rate. As another example, obtaining the sensor signals from the sensor of the device at block 502 may include obtaining the sensor signals while operating the sensor in a first operation state that includes a first spatial sampling by the sensor, and modifying the operation state of the sensor or the one or more additional sensors may include operating the sensor in a second operation state that includes a second spatial resolution that is less than the first spatial sampling. As another example, obtaining the sensor signals from the sensor of the device at block 502 may include obtaining the sensor signals while operating the sensor in a first operation state that includes a first frame rate for the sensor, and modifying the operation state of the sensor or the one or more additional sensors may include deactivating the sensor and activating and/or operating one of the one or more additional sensors that has a power consumption and an accuracy that are lower, respectively, than a power consumption and an accuracy of the sensor.

For example, the electronic device may operate the sensor or the one or more additional sensors (e.g., one or more other sensors of sensors 129 and/or one or more sensors of another device) by operating the sensor (e.g., the same sensor(s) used to obtain the sensor signals at block 502) at a reduced frame rate or sampling rate (e.g., relative to a nominal or current frame rate or sampling rate), by operating the sensor with a reduced spatial sampling (e.g., operating an image sensor and/or a depth sensor using less than all of the pixels of the sensor) and/or by reducing the complexity of the processing of the data from the sensor (e.g., relative to a nominal or current processing complexity for the data from the sensor). As another example, the electronic device may operate the sensor or the one or more additional sensors by operating one of the one or more additional sensors (e.g., one of the one or more additional sensors that has a power consumption and an accuracy that are lower, respectively, than a power consumption and an accuracy of the sensor).

In the example of FIG. 5, the recommendation engine (e.g., recommendation engine 304) may have been trained and/or otherwise configured to recommend a sensor for tracking of an object that is detected by the recommendation engine, based on a learned accuracy for tracking that object or an object having a same type as the object. In this example, the object and/or the object type may be determined without any a priori knowledge or input to the recommendation engine as to the type of object to be detected (e.g., the recommendation engine may include a machine learning model having been trained to recognize any of various objects that may be present in the physical environment without knowing which objects are expected to be present in the physical environment).

In one or more implementations, the type(s) of one or more objects to be detected and/or tracked may be provided to the recommendation engine (e.g., in an application request by an application such as XR application 302).

Figure 6:
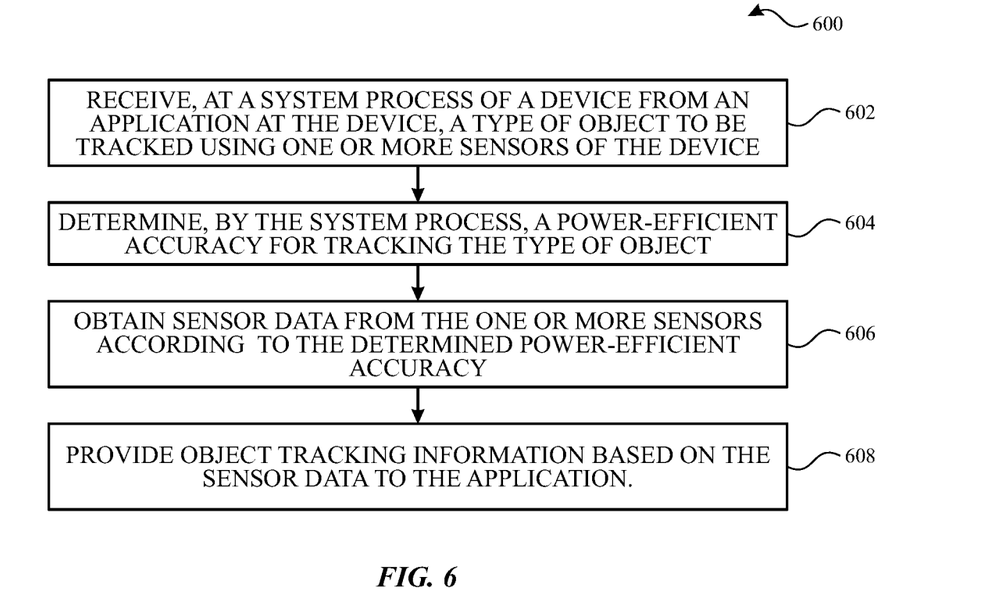
FIG. 6 illustrates a flow chart of example operations that may be performed for providing power efficient object tracking based on a provided object type in accordance with implementations of the subject technology.

FIG. 6 illustrates a flow diagram of an example process 600 for providing power efficient object tracking when on object type is provided for object tracking in accordance with implementations of the subject technology. For explanatory purposes, the process 600 is primarily described herein with reference to the electronic device 100*a* of FIGS. 1A, 1B, and 3. However, the process 600 is not limited to the electronic device 100*a* of FIGS. 1A, 1B, and 3, and one or more blocks (or operations) of the process 600 may be performed by one or more other components of other suitable devices, including the electronic device 100*b* and/or the electronic device 100*c*. Further for explanatory purposes, some of the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, at block 602, a system process (e.g., system process 300 of FIG. 3) of a device may receive, from an application (e.g., XR application 302) at the device, a type of object to be tracked using one or more sensors (e.g., sensors 129 and/or camera(s) 119) of the device. For example, an XR application such as XR application 302 may provide a request to the system process for tracking a vehicle, a soda can, a horizontal surface, a vertical surface, an animal, a table, a piece of sporting equipment, a musical instrument, a door, a window, a window sill. The type of object may be an entire object or a portion of an object, such as portion 210 of physical object 208 of FIG. 2.

At block 604, the system process may determine a power-efficient accuracy for tracking the type of object. For example, the object type may be provided to a system process (e.g., recommendation engine 304) that has been trained to output a sensor recommendation and/or a sensor accuracy (e.g., a spatial and/or temporal resolution of the sensor data and/or a type of sensor data) that can be used to provide power-efficient tracking of an object in the physical environment, based on a provided object type (e.g., using a sensor, a combination of sensors, a mode of operation of a sensors, or a combination of modes of operation for a combination of sensors that can track the object without using device power and/or processing resources that would provide additional accuracy that is not needed to track the object).

At block 606, sensor data from the one or more sensors may be obtained (e.g., by the system process from the sensor(s)) according to the determined power-efficient accuracy.

At block 608, the object tracking information based on the sensor data may be provided to the application for object tracking and/or to the system process for object tracking on behalf of the application. In one or more implementations, the object tracking data that is provided to the application may include the sensor data. In these implementations, the application may process the sensor data to track the object. In one or more implementations, the sensor data obtained at block 606 may also, or alternatively, be processed by the system process to generate the object tracking information based on the sensor data. In these implementations, the object tracking information that is provided to the application may be processed object tracking information. The object tracking information may include, for example, a three-dimensional location of the object relative to the electronic device, a two-dimensional location of the object in a view of the physical environment through or via a display of the device, and/or other object size, location, position, orientation, color, and/or other features as determined based on the obtained sensor data.

In one or more implementations, the system process may obtain additional information such as power information (e.g., a charge level of a battery) of the device and/or user device usage history information. In one or more implementations, the system process may modify the power-efficient accuracy for tracking the object based on the power information for the device, obtain different sensor data from the one or more sensors according to the modified power-efficient accuracy, and provide the different sensor data to the application and/or to the system process for object tracking on behalf of the application.

In the examples of FIGS. 5 and 6, the accuracy for detecting and/or tracking an object may be determined by a system process (e.g., including recommendation engine 304) of an electronic device such as electronic device 100*a*. In one or more implementations, a requested accuracy for tracking may be provided (e.g., by an application such as XR application 302) to the recommendation engine or to another system process (e.g., in an application request for sensor data having the provided accuracy and/or object tracking with a particular accuracy). In an implementation in which the accuracy is requested by an application, the system process (e.g., including the recommendation engine) may determine a recommendation that indicates which of several sensors to use and/or a resolution and/or a sampling or frame rate for operation the determined sensor(s) to achieve the requested accuracy of sensor data and/or object tracking.

Figure 7:
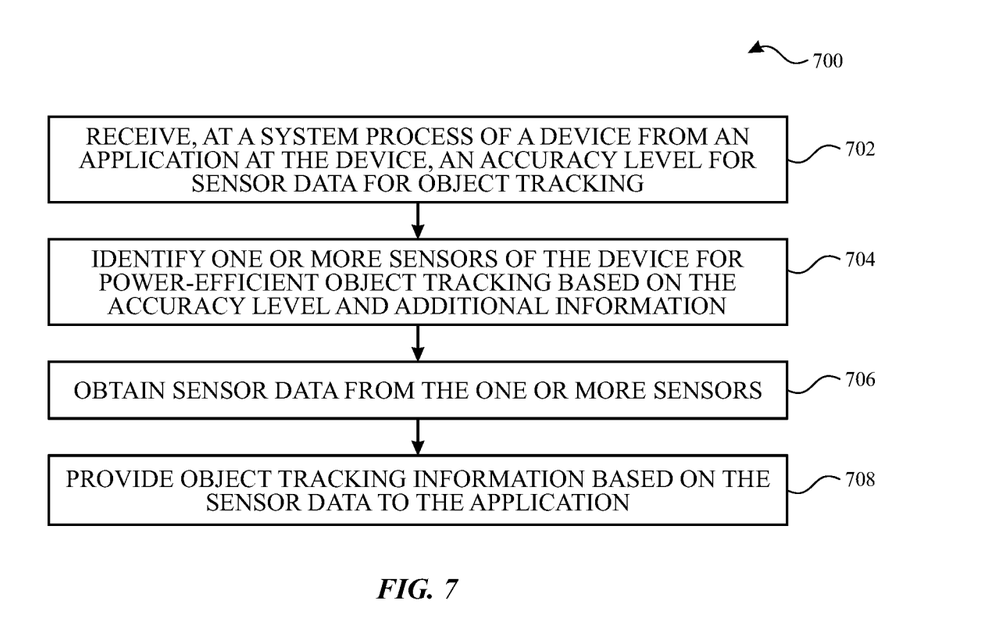
FIG. 7 illustrates a flow chart of example operations that may be performed for providing power efficient object tracking based on a requested accuracy level in accordance with implementations of the subject technology.

FIG. 7 illustrates a flow diagram of an example process 700 providing power efficient object tracking when an accuracy for object tracking is requested in accordance with implementations of the subject technology. For explanatory purposes, the process 700 is primarily described herein with reference to the electronic device 100*a* of FIGS. 1A, 1B, and 3. However, the process 700 is not limited to the electronic device 100*a* of FIGS. 1A, 1B, and 3, and one or more blocks (or operations) of the process 700 may be performed by one or more other components of other suitable devices, including the electronic device 100*b* and/or the electronic device 100*c*. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, a system process (e.g., system process 300 including a recommendation engine such as a machine learning engine) of a device may receive from an application (e.g., XR application 302) at the device, an accuracy level for sensor data for object detection and/or an accuracy level for object tracking. For example, the accuracy level may include a number of degrees of freedom to be tracked using the sensor data and/or accuracy features of the sensor data itself, such as spatial and/or temporal resolution of the data. In one or more implementations, the accuracy level may be a vector that indicates different levels of accuracy for different tracking parameters (e.g., a high spatial resolution and a low temporal resolution, a low temporal resolution and a high spatial resolution, a high spatial resolution and a high temporal resolution, or a low spatial resolution and a low temporal resolution). In one or more implementations, an accuracy level vector may be generated by an application and provided to the system process, or one or more pre-defined accuracy level vectors may be provided by the system process for selection by an application.

For example, in one or more implementations, the system process may provide a set of (e.g., pre-defined) accuracy levels (e.g., each defining one or more of a spatial resolution and a temporal resolution) that can be selected by applications running on the device. In any of these implementations, receiving the accuracy level at block 702 may include receiving a selection, by the application, of the accuracy level from a set of accuracy levels available from the system process. The set of accuracy levels may include a six degrees-of-freedom (6DOF) accuracy level (e.g., for tracking the angular position of the object relative to the electronic device, the distance of the object from the electronic device, and/or the shape and/or orientation of the object), a three degrees-of-freedom (3DOF) accuracy level (e.g., for tracking only the angular position of the object relative to the device), one or more spatial resolution accuracy levels (e.g., each corresponding to a number of data points per unit distance, per unit area or per unit volume in physical space and/or pixel space), and/or one or more temporal resolution accuracy levels (e.g., e.g., each having a corresponding sampling rate for a sensor such as a depth sensor or a corresponding frame rate for an image sensor) and/or one or more accuracy levels that includes a combination of the above.

In one or more implementations, even when a particular accuracy level is requested, the system process may modify the accuracy level. For example, the accuracy level may be modified based on additional information such as power information for the device (e.g., the accuracy level may be increased relative to the requested accuracy level when the battery of the device is charged to above a charge threshold or when the device is coupled to external power, or the accuracy level may be decreased relative to the requested accuracy level when the battery of the device has a charge level that is below a charge threshold) and/or based on additional information such as usage history information stored at the device (e.g., the accuracy level may be increased relative to the requested accuracy level based on an indication that the user typically only tracks an object and/or operates an application that tracks an object for short amounts of time, such as seconds or minutes, or the accuracy level may be decreased relative to the requested accuracy level based on an indication that the user typically tracks an object and/or operates an application that tracks an object for long amounts of time such as several minutes, an hour, or several hours).

At block 704, one or more sensors of the device may be identified for power-efficient object tracking based on the accuracy level and/or additional information. The additional information may include device power information, user device usage history information, and/or sensor data such as previously obtained sensor data. For example, the system process (e.g., including the recommendation engine) may determine one or more of several sensors to be used to obtain the sensor data having the requested accuracy level (or a modified accuracy level) and/or for power-efficient tracking of the object based on the requested accuracy level (or a modified accuracy level). For example, the application may request a spatial resolution for object tracking that can only be provided by the highest resolution sensor of the device (e.g., a color camera of the device). Based on this request, the system process may identify the color camera as the most power-efficient sensor for the power-efficient object tracking. In another example, the application may request a spatial resolution for object tracking that can be provided by the color camera or by a lower resolution sensor such as a monochrome camera (e.g., a single channel imaging sensor) or a depth sensor. In order to provide the sensor data with the requested accuracy, while avoiding unnecessary power consumption (e.g., by the color camera), the system process may identify the monochrome camera or the depth sensor as the power-efficient sensor to be used for power-efficient object tracking for that accuracy level.

At block 706, sensor data from the one or more sensors may be obtained. For example, in an implementation in which the accuracy level is selected from a set of accuracy levels that include a 6DOF accuracy level and a 3DOF accuracy level, identifying the one or more sensors based on the three degrees-of-freedom accuracy level may include identifying a single sensor of the device, and identifying the one or more sensors according to the six degrees-of-freedom accuracy level may include identifying multiple sensors of the device.

At block 708, object tracking information based on the sensor data may be provided to the application and/or to the system process for tracking the object on behalf of the application. In one or more implementations, the object tracking data that is provided to the application may include the sensor data. In these implementations, the application may process the sensor data to track the object. In one or more implementations, the sensor data obtained at block 706 may also, or alternatively, be processed by the system process to generate the object tracking information based on the sensor data. In these implementations, the object tracking information that is provided to the application may be processed object tracking information. The object tracking information may include, for example, a three-dimensional location of the object relative to the electronic device, a two-dimensional location of the object in a view of the physical environment through or via a display of the device, and/or other object size, location, position, orientation, color, and/or other features as determined based on the obtained sensor data.

In any of the examples of FIGS. 5, 6, or 7, the application may generate virtual content for display at or near the object based on the sensor data and/or object tracking information that is based on the sensor data. The electronic device may then display the virtual content generated by the application, at or near the object based on the sensor data and/or the object tracking information, using a display of the device (e.g., display 325). Displaying the virtual content using the display may include displaying the virtual content with a portion of the display that corresponds to a direct view or a pass-through video view of the object.

Various processes defined herein consider the option of obtaining and utilizing a user's personal information. For example, such personal information may be utilized in order to provide power efficient object tracking. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the subject disclosure, a method is provided that includes obtaining sensor signals from a sensor of a device; providing the sensor signals to a recommendation engine; obtaining, as an output from the recommendation engine responsive to providing the sensor signals, a sensor recommendation indicating at least one sensor for continuing to track an object detected based on the sensor signals; and operating the sensor or one or more additional sensors based on the sensor recommendation from the recommendation engine.

In accordance with aspects of the subject disclosure, a method is provided that includes receiving, at a system process of a device from an application at the device, a type of object to be tracked using one or more sensors of the device; determining, by the system process, a power-efficient accuracy for tracking the type of object; obtaining sensor data from the one or more sensors according to the determined power-efficient accuracy; and providing object tracking information based on the sensor data to the application.

In accordance with aspects of the subject disclosure, a method is provided that includes receiving, at a system process of a device from an application at the device, an accuracy level for sensor data for object tracking; identifying one or more sensors of the device for power-efficient object tracking based on the accuracy level and additional information; obtaining sensor data from the one or more sensors; and providing object tracking information based on the sensor data to the application.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
obtaining sensor signals from a sensor of a device;
providing the sensor signals to a recommendation engine;
obtaining, as an output from the recommendation engine responsive to providing the sensor signals and while tracking, by the device, an object detected based on the sensor signals without use of an other device external to the device, a sensor recommendation indicating at least one sensor for continuing to track the object detected based on the sensor signals without using the other device external to the device; and
modifying an operation state of the sensor or one or more additional sensors based on the sensor recommendation from the recommendation engine.

2. The method of claim 1, wherein obtaining the sensor signals from the sensor of the device comprises obtaining the sensor signals while operating the sensor in a first operation state that includes a first frame rate for the sensor, and wherein modifying the operation state of the sensor or the one or more additional sensors comprises operating the sensor in a second operation state that includes a second frame rate that is less than the first frame rate.

3. The method of claim 1, wherein obtaining the sensor signals from the sensor of the device comprises obtaining the sensor signals while operating the sensor in a first operation state that includes a first spatial sampling by the sensor, and wherein modifying the operation state of the sensor or the one or more additional sensors comprises operating the sensor in a second operation state that includes a second spatial sampling that is less than the first spatial sampling.

4. The method of claim 1, wherein obtaining the sensor signals from the sensor of the device comprises obtaining the sensor signals while operating the sensor in a first operation state that includes a first frame rate for the sensor, and wherein modifying the operation state of the sensor or the one or more additional sensors comprises deactivating the sensor and operating one of the one or more additional sensors that has a power consumption and an accuracy that are lower, respectively, than a power consumption and an accuracy of the sensor.

5. The method of claim 4, wherein the sensor comprises a camera.

6. The method of claim 5, wherein the one of the one or more additional sensors comprises a depth sensor.

7. The method of claim 5, wherein the camera comprises a color camera or a monochrome camera.

8. The method of claim 1, further comprising detecting the object by performing a computer vision detection of the object, and wherein the output from the recommendation engine comprises a recommendation to operate a depth sensor for continuing to track the detected object.

9. The method of claim 1, further comprising detecting the object by performing a computer vision detection of the object, and wherein the output from the recommendation engine comprises a recommendation to obtain depth information based on image data for continuing to track the detected object.

10. The method of claim 1, further comprising detecting the object by performing a computer vision detection of the object, and wherein the output from the recommendation engine comprises a recommendation for image-based tracking of the detected object without obtaining depth information for the detected object.

11. The method of claim 1, wherein the recommendation engine comprises a machine learning engine having been trained to generate the output using object tracking history information stored at the device, the object tracking history information comprising information previously obtained, by the device, while tracking the object or another object over a previous time period.

12. The method of claim 11, wherein the object tracking history information includes a length of time that a user of the device previously operated the device to track an object having a type that is similar to a type of the object.

13. The method of claim 11, wherein the object tracking history information includes a length of time that a user of the device typically operates the device to track an object while the device is at or near a current location of the device.

14. The method of claim 11, wherein the object tracking history information includes a length of time that a user of the device typically operates the device to track an object during a time period that is similar to a current time period.

15. The method of claim 11, wherein the object tracking history information includes a pre-adjusted level of tracking accuracy configured by a user for the device to track an object having a type that is similar to a type of the detected object.

16. The method of claim 11, wherein the object tracking history information includes a pre-adjusted level of tracking accuracy configured by a user for the device to track an object while the device is at or near a current location of the device.

17. The method of claim 11, wherein the object tracking history information includes a pre-adjusted level of tracking accuracy configured by a user for the device to track an object during a time period that is similar to a current time period.

18. The method of claim 1, further comprising obtaining the detected object, as an additional output from the recommendation engine.

19. A device, comprising:
a memory; and
one or more processors configured to:
  obtain sensor signals from a sensor of the device;
  provide the sensor signals to a recommendation engine;
  obtain, as an output from the recommendation engine responsive to providing the sensor signals and while tracking, by the device, an object without use of an other device external to the device, a sensor recommendation indicating at least one sensor for continuing to track the object detected based on the sensor signals without using the other device external to the device; and
  modify an operation state of the sensor or one or more additional sensors based on the sensor recommendation from the recommendation engine.

20. The device of claim 19, wherein the one or more processors are configured to:
  obtain the sensor signals from the sensor of the device by obtaining the sensor signals while operating the sensor in a first operation state that includes a first frame rate for the sensor, and
  modify the operation state of the sensor or the one or more additional sensors by operating the sensor in a second operation state that includes a second frame rate that is less than the first frame rate.

21. The device of claim 19, wherein the one or more processors are configured to:
  obtain the sensor signals from the sensor of the device by obtaining the sensor signals while operating the sensor in a first operation state that includes a first spatial sampling by the sensor, and
  modify the operation state of the sensor or the one or more additional sensors by operating the sensor in a second operation state that includes a second spatial sampling that is less than the first spatial sampling.

22. The device of claim 19, wherein the one or more processors are configured to:
  obtain the sensor signals from the sensor of the device by obtaining the sensor signals while operating the sensor in a first operation state that includes a first frame rate for the sensor, and
  modify the operation state of the sensor or the one or more additional sensors by deactivating the sensor and operating one of the one or more additional sensors that has a power consumption and an accuracy that are lower, respectively, than a power consumption and an accuracy of the sensor.

23. The device of claim 22, wherein the sensor comprises a camera.

24. The device of claim 23, wherein the one of the one or more additional sensors comprises a depth sensor.

25. A non-transitory computer-readable medium comprising instructions which, when executed by one or more processors, cause the one or more processors to perform operations comprising:
  obtaining sensor signals from a sensor of a device;
  providing the sensor signals to a recommendation engine;
  obtaining, as an output from the recommendation engine responsive to providing the sensor signals and while tracking, by the device without use of an other device external to the device, an object detected based on the sensor signals, a sensor recommendation indicating at least one sensor for continuing to track the object detected based on the sensor signals without using the other device external to the device; and
  modifying an operation state of the sensor or one or more additional sensors based on the sensor recommendation from the recommendation engine.

26. The non-transitory computer-readable medium of claim 25, the operations further comprising detecting the object by performing a computer vision detection of the object, and wherein the output from the recommendation engine comprises a recommendation to operate a depth sensor for continuing to track the detected object.

27. The non-transitory computer-readable medium of claim 25, the operations further comprising detecting the object by performing a computer vision detection of the object, and wherein the output from the recommendation engine comprises a recommendation to obtain depth information based on image data for continuing to track the detected object.

28. The non-transitory computer-readable medium of claim 25, the operations further comprising detecting the object by performing a computer vision detection of the object, and wherein the output from the recommendation engine comprises a recommendation for image-based tracking of the detected object without obtaining depth information for the detected object.

29. The non-transitory computer-readable medium of claim 25, wherein the recommendation engine comprises a machine learning engine having been trained to generate the output using user device usage history information stored at the device.

30. The non-transitory computer-readable medium of claim 29, wherein the user device usage history information includes a length of time associated with object tracking or a pre-adjusted level of tracking accuracy.

31. The method of claim 1, further comprising:
  providing, to the recommendation engine along with the sensor signals, object classification information for the detected object, the object classification information based on the sensor signals,
  wherein obtaining the sensor recommendation as the output from the recommendation engine responsive to providing the sensor signals comprises obtaining the sensor recommendation as the output from the recommendation engine responsive to providing the sensor signals and the object classification information,
  wherein the sensor recommendation comprises a power-efficient object tracking recommendation for the detected object.

* * * * *